United States Patent
Starr et al.

(10) Patent No.: US 7,184,239 B2
(45) Date of Patent: Feb. 27, 2007

(54) ALIGNMENT SYSTEM METHOD AND APPARATUS FOR MULTI-UNIT STORAGE SYSTEMS

(75) Inventors: Matthew Thomas Starr, Lafyette, CO (US); Christopher Anthony Pollard, Monument, CO (US); Walter Wong, Boulder, CO (US); Ronald Marc Permut, Louisville, CO (US)

(73) Assignee: Spectra Logic Corporation, Boulder, CO (US)

( * ) Notice: Subject to any disclaimer, the term of this patent is extended or adjusted under 35 U.S.C. 154(b) by 0 days.

(21) Appl. No.: 11/089,749

(22) Filed: Mar. 24, 2005

(65) Prior Publication Data

US 2006/0215300 A1   Sep. 28, 2006

(51) Int. Cl.
*G11B 15/18* (2006.01)

(52) U.S. Cl. ...................................... 360/69

(58) Field of Classification Search .................... None
See application file for complete search history.

(56) References Cited

U.S. PATENT DOCUMENTS

| | | | |
|---|---|---|---|
| 5,604,987 A | | 2/1997 | Cupp |
| 5,703,843 A | * | 12/1997 | Katsuyama et al. ..... 369/30.33 |
| 6,005,734 A | * | 12/1999 | Shimada et al. .............. 360/69 |
| 6,144,519 A | * | 11/2000 | Hanaoka et al. .............. 360/92 |
| 6,606,798 B2 | | 8/2003 | El-Katcha et al. |
| 2004/0105187 A1 | | 6/2004 | Woodruff et al. |
| 2004/0223253 A1 | | 11/2004 | Woodruff et al. |
| 2004/0264037 A1 | | 12/2004 | Downey et al. |
| 2004/0264038 A1 | | 12/2004 | Heineman et al. |
| 2004/0264039 A1 | | 12/2004 | Armagost et al. |
| 2004/0264040 A1 | | 12/2004 | Armagost et al. |
| 2004/0264041 A1 | | 12/2004 | Kumpon et al. |
| 2004/0264042 A1 | | 12/2004 | Pollard et al. |
| 2005/0007692 A1 | | 1/2005 | Thompson et al. |
| 2005/0047258 A1 | | 3/2005 | Starr et al. |
| 2005/0057847 A1 | | 3/2005 | Armagost et al. |
| 2005/0063089 A1 | | 3/2005 | Starr et al. |
| 2005/0065637 A1 | | 3/2005 | Lantry et al. |
| 2005/0137742 A1 | * | 6/2005 | Goodman et al. .......... 700/214 |
| 2005/0185323 A1 | | 8/2005 | Brace et al. |

(Continued)

FOREIGN PATENT DOCUMENTS

WO   WO 2005/010661 A2   2/2005

OTHER PUBLICATIONS

U.S. Appl. No. 10/950,613, Starr et al.

(Continued)

*Primary Examiner*—K. Wong (57) ABSTRACT

Disclosed is a method and apparatus system for aligning a multi-unit storage system. The alignment system for a storage apparatus includes a first and second storage unit which includes media support locations. The media support locations are capable of supporting at least one storage media element and at least one storage device adapted to store and retrieve data to and from the storage media element associated with at least one of the storage units. The storage apparatus further includes at least one robotic system, an alignment indication device and an alignment means capable of positioning the first and second storage unit substantially in alignment for the robotic system to access the media support locations and the storage device wherein the alignment means cooperates with the alignment indication device to confirm the positioning is in alignment.

21 Claims, 11 Drawing Sheets

U.S. PATENT DOCUMENTS

2005/0195517 A1 9/2005 Brace et al.
2005/0195518 A1 9/2005 Starr et al.
2005/0195519 A1 9/2005 Kumpon et al.
2005/0195520 A1 9/2005 Starr et al.
2005/0219964 A1 10/2005 Pollard et al.
2005/0246484 A1 11/2005 Lantry et al.
2005/0267627 A1 12/2005 Lantry et al.

OTHER PUBLICATIONS

U.S. Appl. No. 10/951,321, Wong et al.
U.S. Appl. No. 10/980,594, Fenske et al.
U.S. Appl. No. 11/011,812, Starr et al.
U.S. Appl. No. 11/019,911, Curtis et al.
U.S. Appl. No. 11/037,985, Permut et al.
U.S. Appl. No. 11/040,937, Starr et al.
U.S. Appl. No. 11/123,725, Rector et al.
U.S. Appl. No. 11/126,025, Rector et al.
U.S. Appl. No. 11/145,768, Downey et al.
U.S. Appl. No. 11/230,146, Starr et al.
U.S. Appl. No. 11/240,893, Starr et al.
U.S. Appl. No. 11/264,920, Lantry et al.
PCT Application No. US05/45168, Spectra Logic Corporation.
PCT Application No. US05/46447, Spectra Logic Corporation.

* cited by examiner

ALIGNMENT SYSTEM METHOD AND APPARATUS FOR MULTI-UNIT STORAGE SYSTEMS

CROSS-REFERENCE TO RELATED APPLICATIONS

None.

FIELD OF THE INVENTION

The present invention relates generally to aligning a multi-unit storage system.

BACKGROUND

Data storage libraries, including tape libraries having mobile tape media, are typically used to store and retrieve large amounts of data for data manipulation and archiving purposes. Data storage libraries are typically comprised of drive devices adapted to read and write data to and from media, such as tape or optical media often housed within the tape libraries. In some instances, additional storage capacity may be needed above and beyond the memory capacity associated with a given storage library. Solutions for increasing storage capacity can include the addition of more storage media to an existing library, data densification through compression routines, and replacement of existing storage media with higher density media when available. Another technique for generating greater storage capacity is to expand a storage library by adding modular libraries to create a multi-module, or unit, storage apparatus.

Expanding storage libraries to multi-modular storage systems for purposes of increasing storage capacity can present a number of new challenges in the context of storage apparatus operation. For instance, multi-module storage libraries that use robotic systems to access the media and drive devices must be capable of accessing all media and drive devices intended to be accessed for each library module. In some cases, a single robotic system may be used to access an entire multi-module storage library, a situation which may be susceptible to accessing problems if each of the storage library modules comprising the storage apparatus is not in proper position relative to one another. Proper positioning is often dependent on the planarity and evenness of the surface or floor on which the apparatus rests. Hence, positioning adjustments to compensate for floor unevenness may be required for the storage apparatus to work. Positioning adjustments to compensate for unevenness on which the storage apparatus rests is currently done laboriously by leveling the system using a carpenter's bubble leveling tool or other imprecise tools.

In an effort to provide an improvement over the standard leveling techniques used to level a storage apparatus, both methods and devices are proposed herein. It is to innovations related to this subject matter that the claimed invention is generally directed.

SUMMARY OF THE INVENTION

The present invention relates generally to aligning a multi-unit storage system, and provides a method and apparatus for aligning multi-unit storage units to function as a single storage apparatus.

One embodiment of the present invention can therefore comprise An alignment system for a storage apparatus comprising: a first and second storage unit comprising media support locations; the support locations capable of supporting at least one storage media element; at least one storage device adapted to store and retrieve data to and from the media element associated with at least one of the storage units; at least one robotic system; an alignment indication device; an alignment means capable of positioning the first and second storage unit substantially in alignment for the robotic system to access the media support locations and the storage device wherein the alignment means cooperates with the alignment indication device to confirm the positioning is in alignment.

Another embodiment of the present invention may therefore comprise a method for aligning a storage apparatus comprising: generating an alignment guide for a first and second storage unit; positioning the first and second storage unit substantially into alignment with guidance from the alignment guide; accessing all storage media elements and storage drive devices comprised by the first and second storage units intended to be accessed by a robotic system when the first and second storage units are substantially in alignment.

Yet another embodiment of the present invention may therefore comprise a means for aligning a storage apparatus comprising: a means for guiding a first and second storage unit into position for a robotic system to access all storage media elements and storage drive devices intended to be accessed by the robotic system comprised by the first and second storage units; a means for moving the first and second storage unit into the position.

Yet another embodiment of the present invention may therefore comprise an alignment system for aligning a first data storage unit and a second data storage unit, each of the storage units including at least one of a storage media element and a storage device, the system comprising: a robotic system for moving a storage media element from the first data storage unit to the second data storage unit; an alignment indication device for aligning the first data storage unit with the second data storage unit so that the robotic system is able to access each storage media element and each storage device included in the first data storage unit and in the second data storage unit.

DETAILED DESCRIPTION

Figure 1:
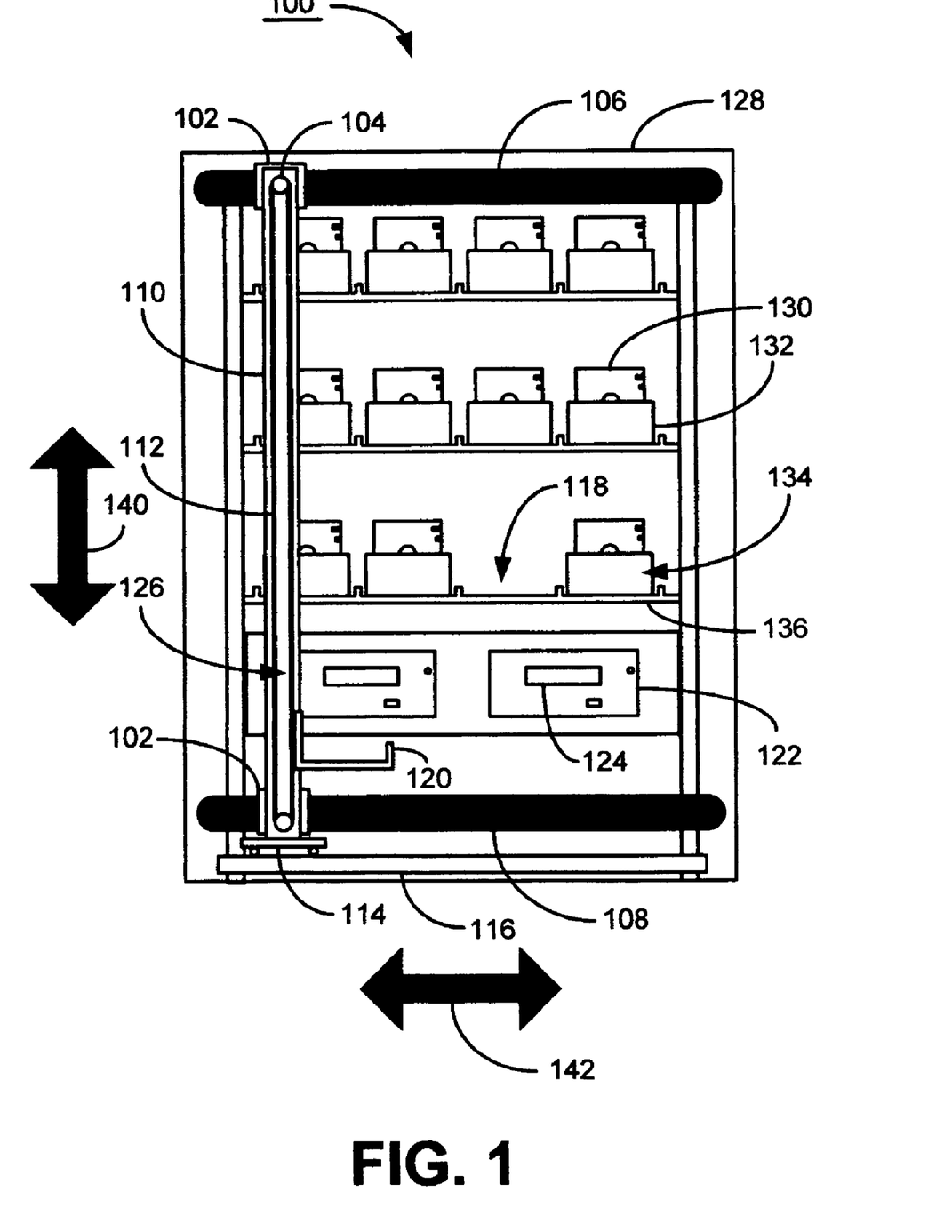
FIG. 1 is a front facing diagram of a tape storage library constructed in accordance with an embodiment of the present invention.

Referring to the drawings in general, and more specifically to FIG. 1, shown therein is a front facing diagram of a tape storage library 100, which is an embodiment of a storage unit accordance to an embodiment of the present invention. In what follows, similar or identical structure is identified using identical callouts.

While the claimed invention has utility in any number of different applications, the tape storage library 100 of FIG. 1 has been provided to illustrate a suitable environment in which the claimed invention can be practiced. In this embodiment, the storage unit 100 generally comprises a plurality of storage media elements 134, support locations 118 for the media elements 134, a robotic system 126, and storage devices 122 all of which is substantially contained within an enclosure 128. Here, the storage elements 134 are illustratively shown as tape packs, which comprise a magazine 132 adapted to support a plurality of tape cassettes 130. The media elements 134 are disposed relative to support locations 118. In the illustrative embodiment, four media elements 134 are shown disposed on to a shelf 136 (which is an example of a support location 118).

In the embodiment shown in FIG. 1, a storage media element 134 can be transported from one of the support locations 118 to one of the storage devices 122, or vise versa. Here, the means for transporting the media element 134 within the storage unit 100 is accomplished by positioning a grasping and transporting device 120, illustrated here in a simplified representation, which is illustrated as constituting part of the robotic system 126. In this example, the grasping and transporting device 120 is connected to a belt 112 and motorized pulley system 104 capable of moving the grasping and transporting device 120 along the vertical support beam 110 as illustrated by the vertical two way arrow 140. The robotic system 126 further uses a positioning motor system 102 to move along upper 106 and lower 108 robot guides, which are adapted to provide a path for the robotic system 126 to traverse across the storage unit 100 as illustrated by the horizontal two way arrow 142. In this example, a chassis 114 supports the robotic system 126 for moving horizontally 142 across a robotic support beam 116. As one of ordinary skill in the art will appreciate, the functions of the positioning motor system 102 and the upper 106 and lower 108 robot guides in addition to the belt 112 and pulley system 104 could be accomplished with a variety of different positioning systems, such as a lead screw system or a belt and pulley system for all, just to name a couple of examples.

In one illustration of an embodiment of FIG. 1, the robotic system 126 can position the grasping and transporting device 120 for transferring a media element 134 between the support location 118 and a storage device 122. The support location 118 in this embodiment is illustratively shown as a shelving system, though other support means, such as, recessed openings and cantilered supports, also are within the scope of the present invention. In this embodiment, a tape cassette 130 is removed from the magazine 132 by the grasping and transporting device 120, and inserted into an opening 124 in the storage device 122 for reading and writing data to and from the tape cassette 130. Once a desired data operation is complete, the tape cassette 130 is returned to the magazine 132 by the grasping and transporting device 120.

Figure 2:
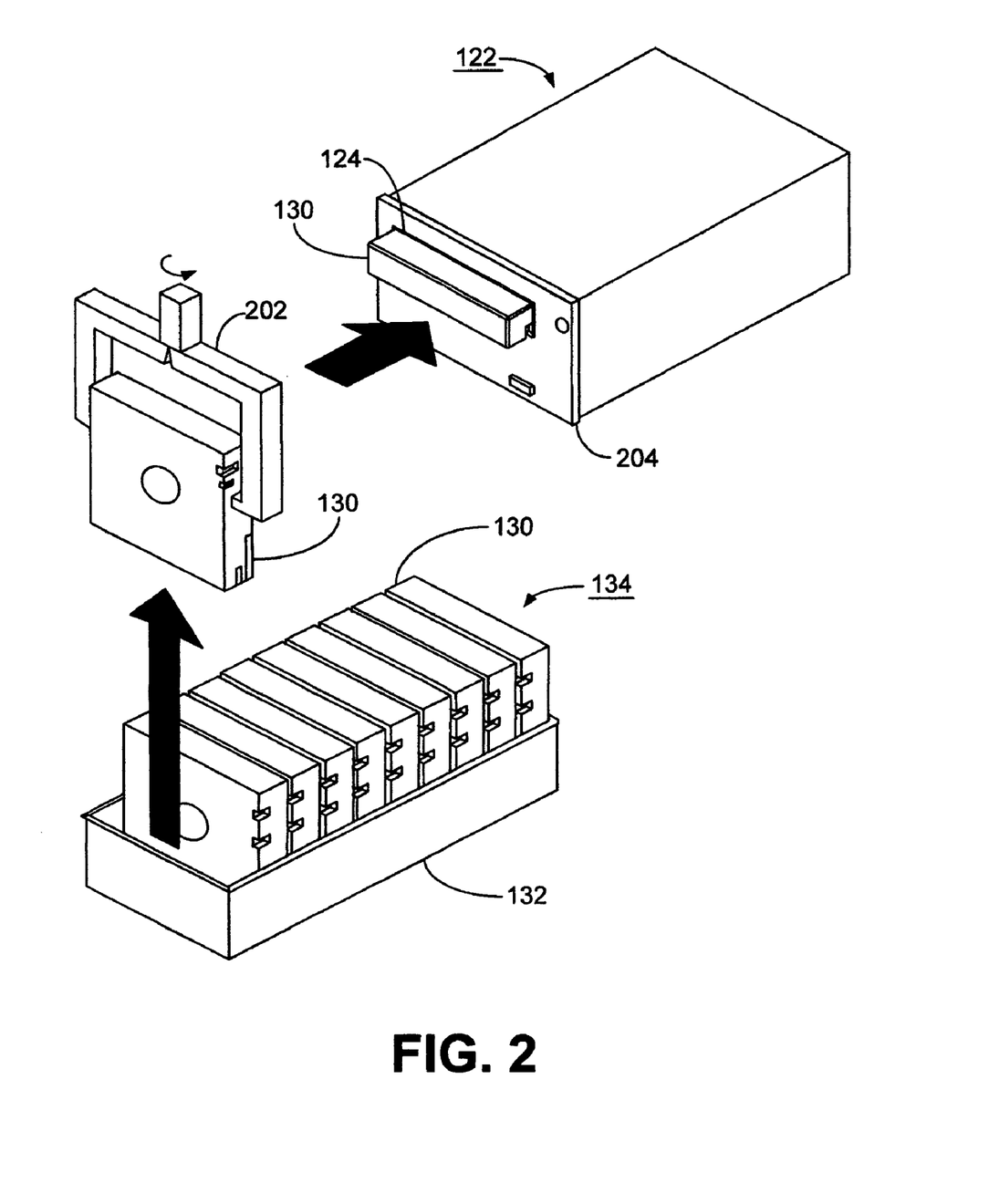
FIG. 2 shows a more detailed drawing of an embodiment of FIG. 1 whereby a grasping device transfers a tape cassette from a tape magazine for use with a tape drive storage device.

FIG. 2 shows a more detailed drawing of an embodiment of FIG. 1 whereby a grasping device 202 transfers a tape cassette 130 from a magazine 132 for use with a tape drive storage device 122. Here, the tape cassette 130 is inserted in the opening 124 in the face 204 of the storage device 122 allowing data to be transferred to and from the tape 130.

Figure 3A:
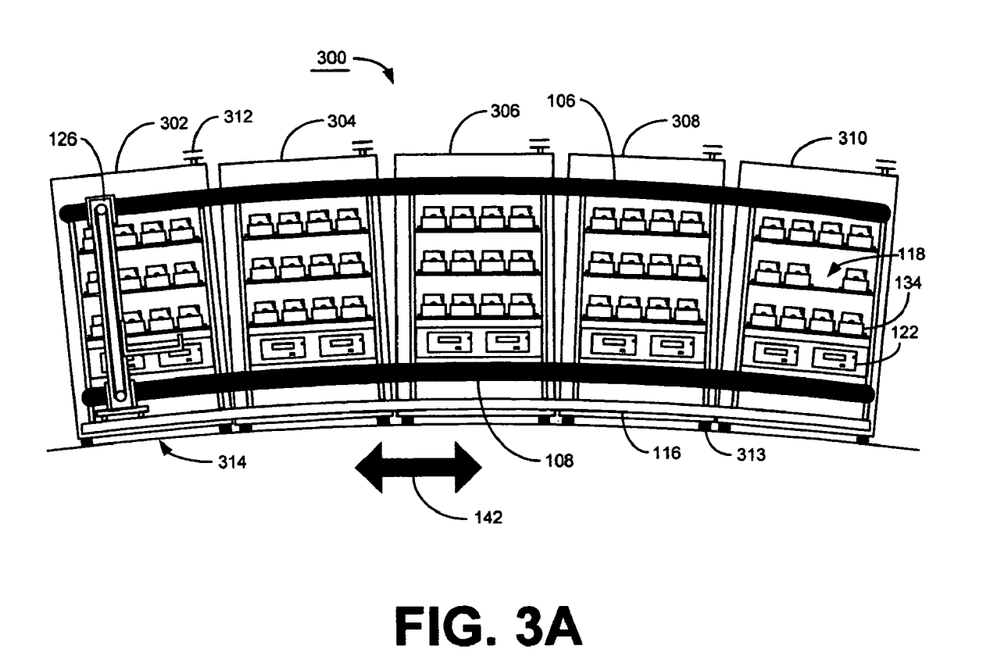
FIG. 3A shows an unaligned storage apparatus comprising five storage units.

In cases where storage capacity needs exceed the storage capacity afforded by a single storage unit, such as the tape library 100, multiple storage units, such as a plurality of tape libraries 100, can be combined to meet such capacity needs. This is illustrated in FIG. 3A wherein a first 302, a second 304, a third 306, a fourth 308 and a fifth 310 storage unit are combined to comprise a storage apparatus 300. Notably, storage apparatus 300 in FIG. 3A is shown in an unaligned state. Here, the storage units, such as the first unit 302, are on a curved floor 314. Though exaggerated in FIG. 3A, a curved floor is not atypical in a warehouse or commercial storage facility often used for housing storage apparatus 300. Other defects in the floor, such as pitting or spalling, also may account for using the present invention. In this arrangement, a single robotic system 126 is shown capable of transferring media elements 134 to storage devices 122 in different locations across the storage units, such as from the first unit 302 to the fifth unit 310 for example. The upper 106 and lower 108 robot guides are adapted to provide a path for the robotic system 126 to traverse across all of the storage units 302, 304, 306, 308 and 310 on the robotic support beam 116, as illustrated by the horizontal two way arrow 142. Although the robotic system 126 may be able to traverse across the storage units, such as from the first unit 302 to the fifth unit 310, the apparatus 300 is in misalignment and the robotic system may be unable to access all of the media elements 134, or support locations 118, and storage devices 122 intended to be accessed due to the misalignment created by the curved floor 314. The robotic system 126 desirably can access media elements 134 and devices 122 that are associated with a storage unit and expected to be used by the storage unit, such as unit 100. Here, the upper 106 and lower 108 robot guides are shown deformed to different lengths (in addition to being nonplanar) due to the warped floor 314.

Figure 3B:
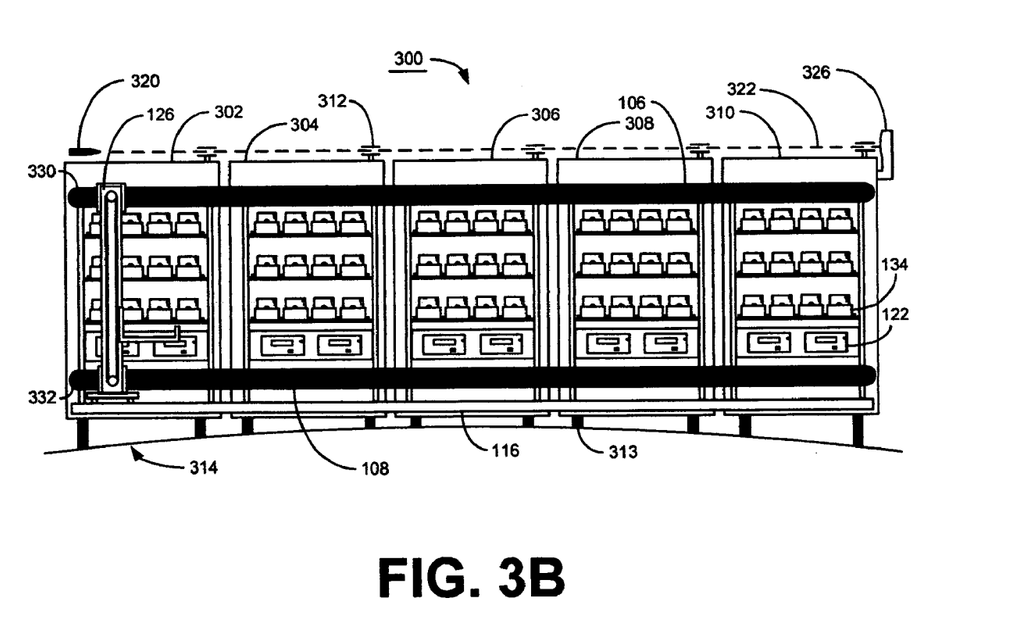
FIG. 3B shows an aligned and leveled storage apparatus embodiment consistent with embodiments of the present invention.

FIG. 3B is an example of an alignment remedy to the misalignment problem illustrated in FIG. 3A consistent with embodiments of the present invention. Here, an alignment indication device, such as an embodiment comprising a laser 320, sight holes 312 and a target device 326, cooperates with an alignment means, such as adjustable feet 313, to position the storage units 302, 304, 306, 308 and 310 in an aligned position, as shown here. The alignment indication device in this embodiment uses a laser beam 322 originating from a laser pointer 320 to pass through sight holes 312 which cooperate with each of the storage units, such as the first unit 302, indicating the state of alignment with an alignment target device 326. The alignment means, such as the adjustable feet 313, are capable of adjusting the storage units 302, 304, 306, 308 and 310 substantially in the alignment position, as shown here. The alignment indication device 320, 312 and 326 cooperates with the alignment means 313 to confirm that the storage units 302, 304, 306, 308 and 310 are in alignment. Once substantially in alignment, the robotic system 126 is capable of accessing all media elements 134 and storage devices 122 intended to be accessed for the storage apparatus 300. Further, in this embodiment, once substantially in alignment, the upper 106 and lower 108 robot guides are substantially parallel, planar and the same length. Here, the upper robot guide's leading edge 330 and the lower robot guide's leading edge 332 are substantially in the same vertical position. In this embodiment, the storage apparatus 300 is also level which can be accomplished by a leveling means, such as an air bubble leveler for example. While the illustrative embodiments described herein are shown with alignment occurring in an X-Y plane, the present invention could equally be practiced in a Z plane, i.e., alignment with respect to the axis normal to the X-Y surface of the drawings. Such z-direction alignment may be useful when arrays of storage units are employed, or when each storage unit includes storage media elements or storage devices accessible from more than one side of a storage unit. In addition, it is contemplated that the invention my be equally practiced when the robotic system 126 is disposed between two banks of opposing storage units and is capable of moving storage media elements between both banks.

Figure 3C:
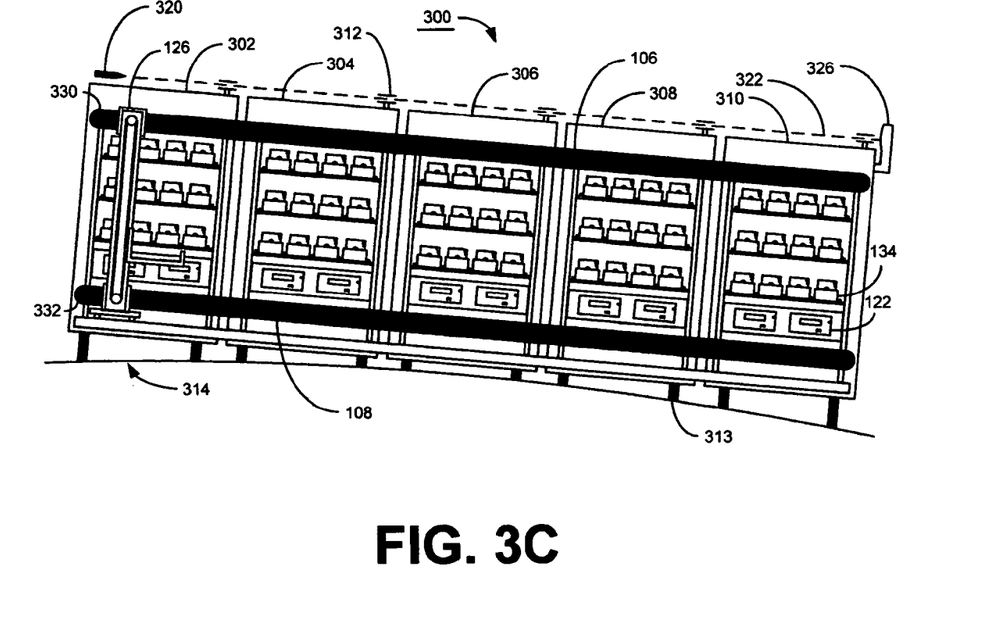
FIG. 3C shows an alternative aligned storage apparatus embodiment consistent with embodiments of the present invention.

FIG. 3C is an alternative embodiment of an alignment remedy to the misalignment problem illustrated in FIG. 3A consistent with embodiments of the present invention. Here, the alignment indication device 320, 312 and 326 cooperates with the alignment means 312 to confirm the positioning of the storage apparatus 300 is in alignment. The alignment means, such as the adjustable feet 313, positions the storage units 302, 304, 306, 308 and 310 substantially in alignment taking account for the uneven floor 314. As shown here, the upper 106 and lower 108 robot guides are substantially parallel, planar and the same length. Though not level, the storage apparatus 300 is in alignment, hence, the robotic system 126 is capable of accessing all media elements 134 and storage devices 122 intended to be accessed by the storage apparatus 300. Also, the upper robot guide's leading edge 330 and the lower robot guide's leading edge 332 are in different vertical positions relative one another.

Figure 4A:
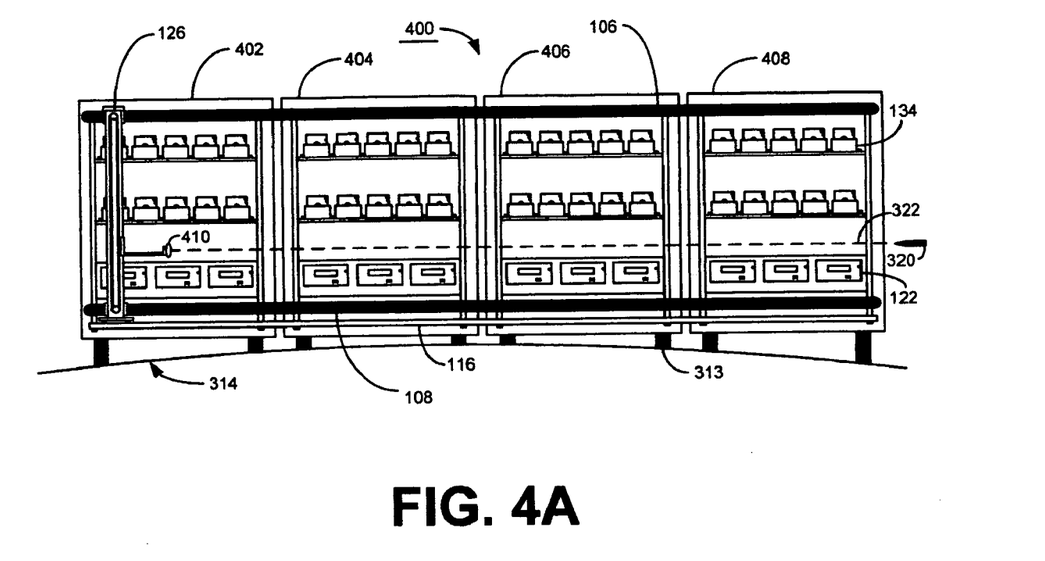
FIG. 4A shows a laser beam directed at a robotic system located at a first storage unit.
Figure 4B:
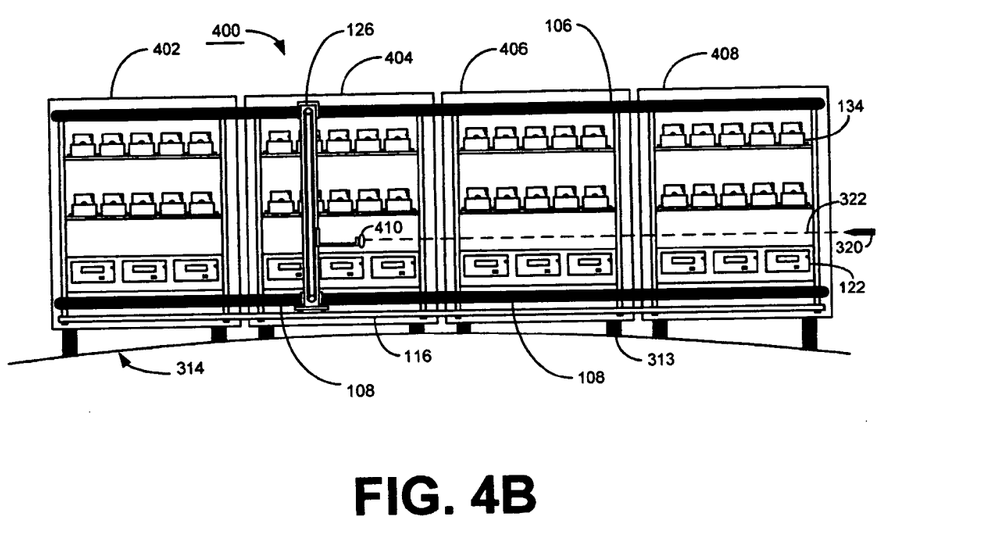
FIG. 4B shows the laser beam directed at the robotic system located at a second storage unit.
Figure 4C:
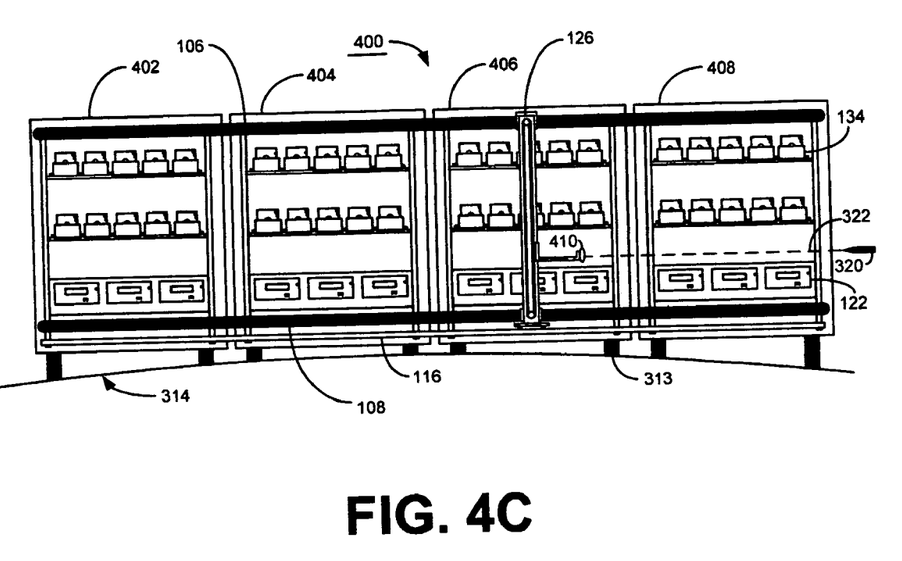
FIG. 4C shows the laser beam directed at the robotic system located at a third storage unit.

FIG. 4A-4C illustrate an embodiment of the present invention whereby the robotic system 126 can be used to traverse across the storage units 402, 404, 406 and 408 in the traverse path as shown wherein the alignment of the storage apparatus 400 is confirmed at different points along the traverse path. Once substantially in alignment, the robotic system 126 is capable of accessing all media elements 134 and storage devices 122 intended to be accessed for the storage apparatus 400.

Specifically, FIG. 4A-4C shows an alternative embodiment of the present invention for aligning a storage apparatus 400 wherein an alignment indication device, such as a laser pointer 320, cooperates with the robotic system 126 to confirm that the positioning of the storage apparatus 400 is in alignment. FIG. 4A shows the laser beam 322 directed at the robotic system 126 located at a first storage unit 402. A first alignment point can be taken from a target 410 located on the robotic system 126 itself. The first storage unit 402 can be positioned by an alignment means, such as an adjustable foot 312, to be substantially in an alignment position to compensate for any curvature, unevenness, or other defect associated with the floor 314. It will be recognized by one skilled in the art that the laser pointer 320 is but one embodiment of an alignment indication device, and that others could include a string and ruler system or a camera and target system, just to name a couple of examples, without departing from the spirit and scope of the present invention.

FIG. 4B shows the robotic system 126 traversed from the first storage unit 402 to a second storage unit 404 for purposes of acquiring additional alignment points along the traverse path created by the upper 106 and lower 108 robot guides. Here, the laser beam 322 is directed at the robotic system 126 located at the second storage unit 404 for a second alignment point which can be taken from the target 410. The second storage unit 404 can be positioned by the alignment means, such the adjustable feet 313, to be substantially in an alignment position relative to the first storage unit 402 to compensate for any curvature or unevenness associated with the floor 314.

FIG. 4C shows the robotic system 126 traversed from the second storage unit 404 to a third storage unit 406 for purposes of acquiring additional alignment points along the traverse path created by the upper 106 and lower 108 robot guides. Here, the laser beam 322 is directed at the robotic system 126 located at the third storage unit 406 for a third alignment point which can be taken from the target 410. The third storage unit 406 can be positioned by the alignment means, in this case the adjustable feet 313, to be substantially in an alignment position relative to the first 402 and second 404 storage units compensating for any curvature or unevenness associated with the floor 314. The same line of reasoning could then be extended to the fourth storage unit 408 in order to adjust the fourth storage unit 408 into alignment relative to the first 402, second 404 and third 406 storage units compensating for any curvature or unevenness associated with the floor 314.

Figure 5:
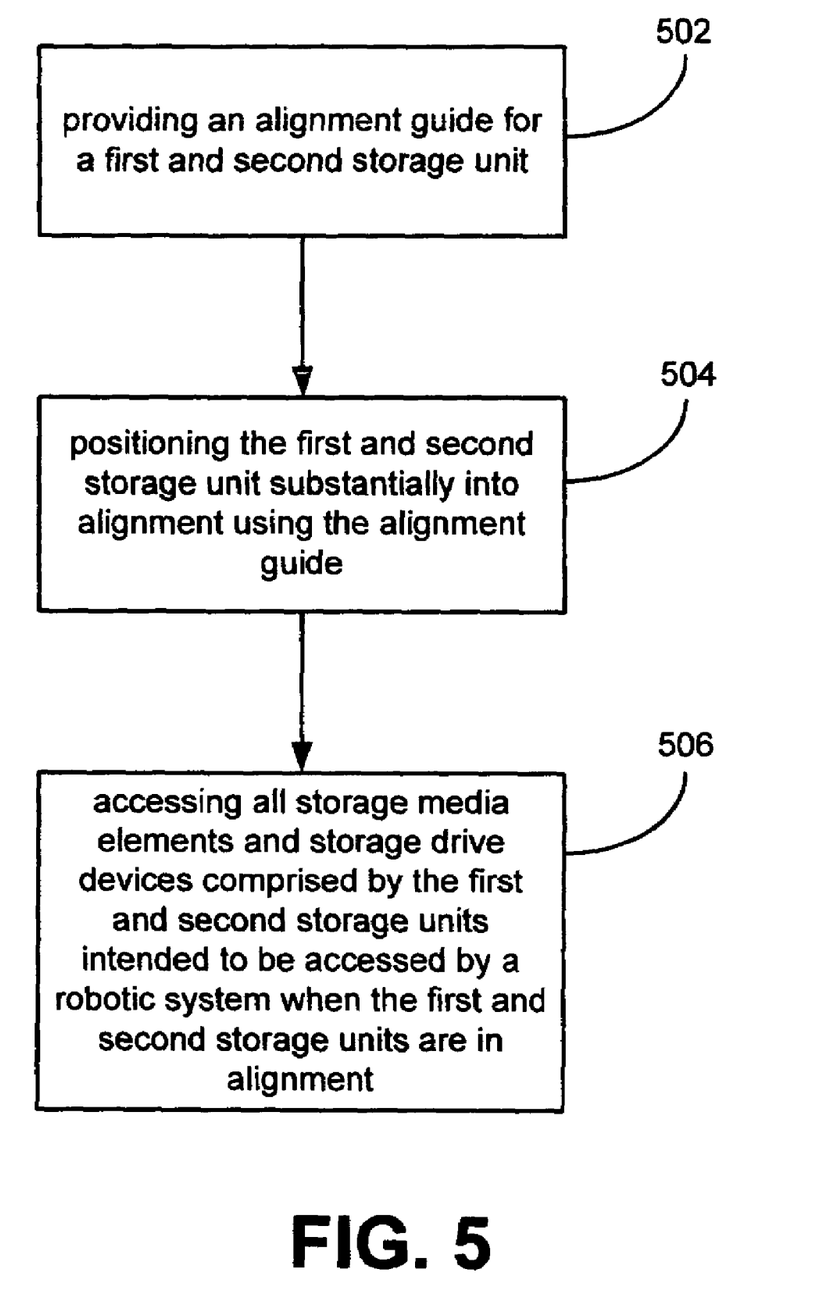
FIG. 5 is a method for aligning a storage apparatus consistent with an embodiment of the present invention.

Referring now to FIG. 5, shown therein is a method for aligning a storage apparatus, such as 300 of FIG. 3B used here for illustrative purposes, consistent with an embodiment of the present invention. It should be recognized that the steps presented in the described embodiments of the present invention do not require any particular sequence. In step 502, an alignment guide is provided for at least a first and a second storage unit, such as the first 302 and second 304 storage units discussed earlier. A means for guiding the first 302 and second 304 storage units could be accomplished with a laser beam, such as the laser beam 322, generated by a laser 320, by a camera system and target, or by a string and ruler system just to name three examples. In step 504, the first 302 and second 304 storage units are positioned, or moved, substantially into alignment using the alignment guide as a feedback tool for alignment confirmation. A means for moving the first 302 and second 304 storage units into the alignment position could be accomplished with adjustable feet, such as the adjustable foot 312, cooperating with each storage unit 304 and 304 to compensate for any unevenness of a surface supporting the storage apparatus 300, such as the floor 314, for example. One example of an adjustable foot 312 could be a screw foot (not shown). Block 506 is a step showing the accessing of all storage media elements, such as media element 134, and storage drive devices, such as storage device 122, comprised by the first 302 and second 304 storage units intended to be accessed by a robotic system, such as the robotic system 126, when the first 302 and second 304 storage units are substantially in alignment. It should be recognized by one skilled in the art that the example of a first 302 and second 304 storage unit are illustrative of a storage apparatus 300 with a plurality of storage units such as including storage unit three 306 and so on.

Figure 6:
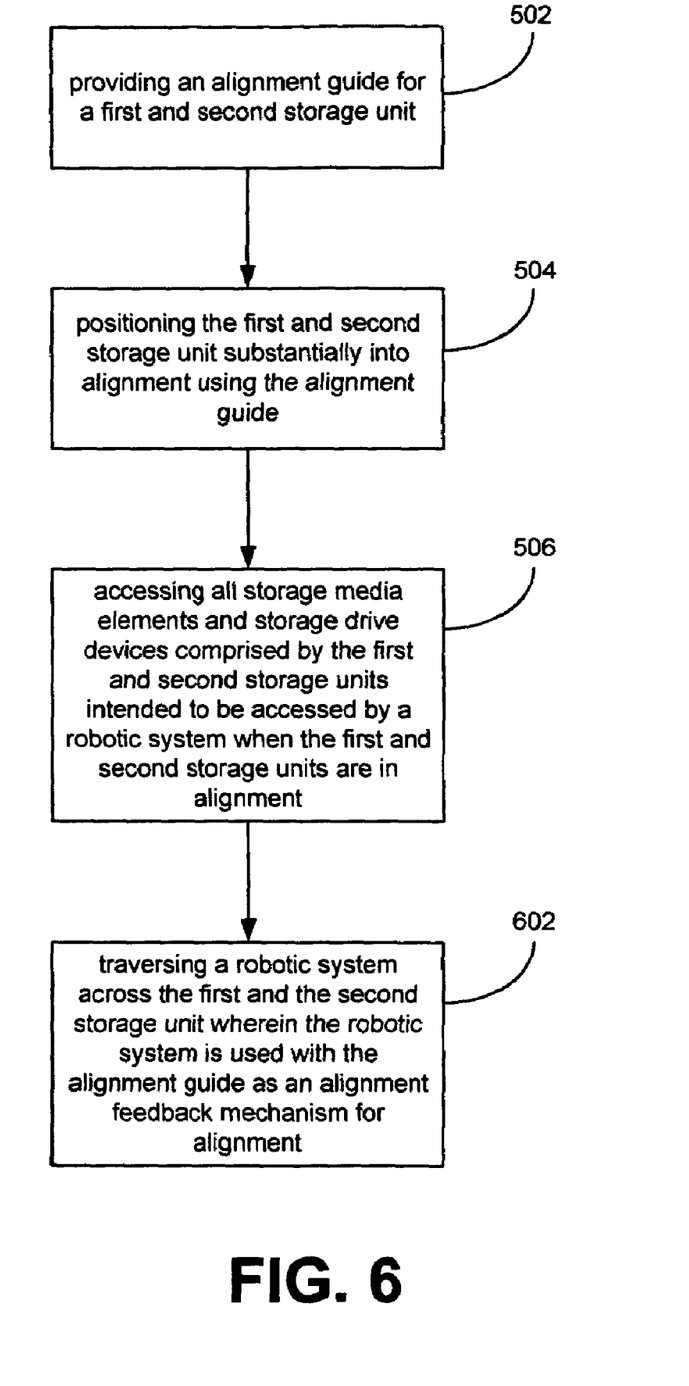
FIG. 6 is an alternative method for aligning a storage apparatus the step of using a robotic system as an alignment feedback tool consistent with an embodiment of the present invention.

FIG. 6 is an alternative embodiment of the present invention which includes method steps 502, 504 and 506 from FIG. 5. Step 602 shows a block comprising traversing a robotic system 126 across a storage apparatus, such as storage apparatus 400 of FIG. 4 used here for illustrative purposes, wherein the robotic system 126 is used with the alignment guide, such as the laser beam 322, as an alignment feedback mechanism for alignment of the system 400. Here, alignment can be confirmed by taking different alignment points along the traverse path of the robotic system 116. A means for traversing the robotic system 126 across a first 402 and second 404 storage unit could be an upper 106 and lower 108 robot guides which could further include a chassis 114 supporting the robotic system 126 to move across a robotic support beam 116, for example. Other means for traversing could be a lead screw system with a motor or a shaft and motor system just to name a couple of other examples. It should be recognized by one skilled in the art that the example of a first 402 and second 404 storage unit could illustrate a storage apparatus 400 with a plurality of storage units such as including storage unit three 406 and so on.

Figure 7:
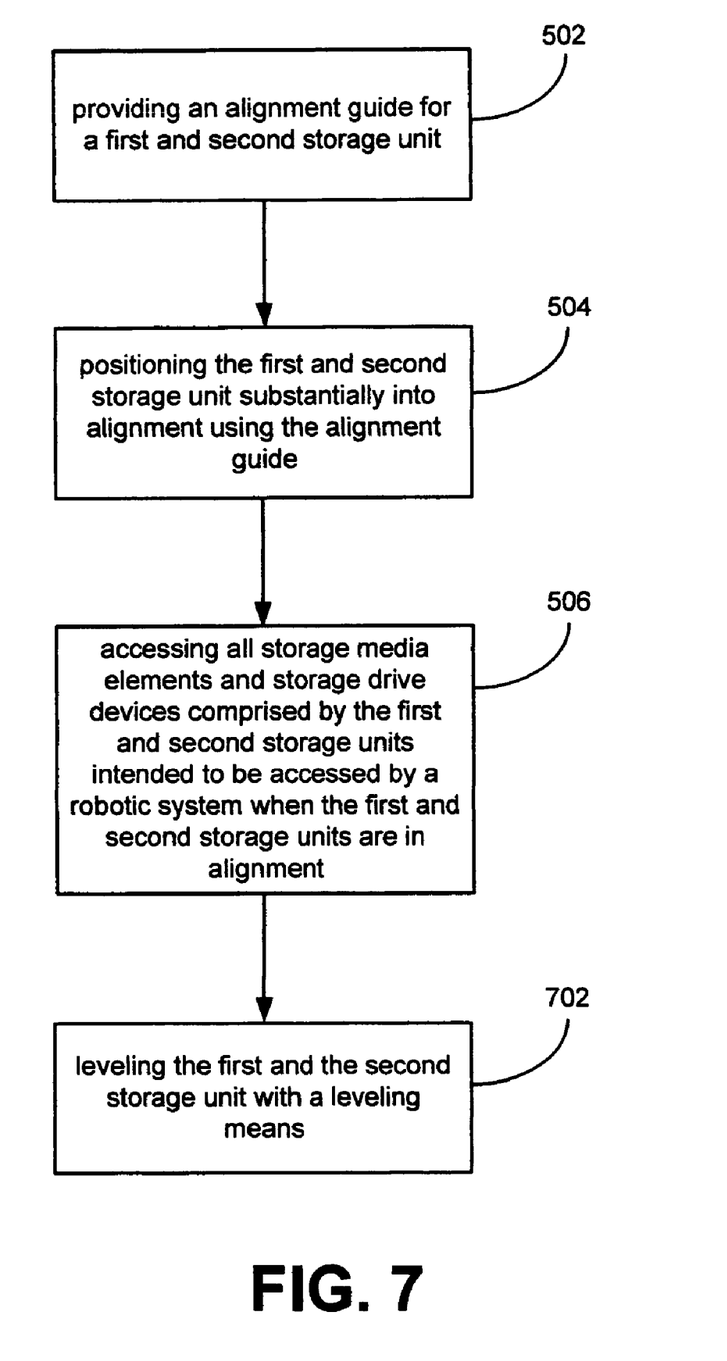
FIG. 7 is an alternative method for aligning a storage apparatus with the added feature of leveling the system consistent with an embodiment of the present invention.

FIG. 7 is yet another alternative embodiment of the present invention which includes method steps 502, 504 and 506 from FIG. 5. Step 702 shows a block comprising leveling a first and a second storage unit, such as the first unit 302 and the second unit 304 of FIG. 3B used here for illustrative purposes, with a leveling means. The leveling means could be accomplished with the additional assistance of a leveling tool, such as an air bubble leveler, for example. Again, it should be recognized by one skilled in the art that the example of a first 302 and second 304 storage unit could illustrate a storage apparatus 300 with a plurality of storage units such as including storage unit three 306 and so on.

Embodiments of the present invention could be commercially practiced with a T-950 storage apparatus from Spectra Logic Corporation of Boulder, Colo. The T-950 storage apparatus can comprise up to five T-950 storage units each with a cassette holding capacity of 950 tapes. The T-950 storage units are tape based libraries that store data on LTO-2 tape cassettes located at support locations within the library. The LTO-2 tape cassettes can be produced by IBM of from IBM Corporation of Armonk, N.Y. The LTO-2 tape cassettes cooperate with LTO-2 tape drives, also manufactured by IBM, for reading and writing data to and from the LTO-2 tape cassettes. Each T-950 storage library can contain up to twenty four LTO-2 tape drives. The T-950 storage apparatus is constructed with an upper and lower belt system that acts as a robot guide to traverse a robotic system adapted to work with the T-950 storage libraries across the T-950 storage apparatus. The robotic system is a belt driven column system on a linear ball bearing way with a Spectra Logic picker and transporter. The T-950 storage units can be adjusted for alignment if on an uneven surface by adjustable screw feet disposed on the bottom of each T-950 unit. A generic laser pointer, such as a laser diode pointer, can be mounted on one side of the T-950 system such that a laser beam can be generated and pointed at a place on the transporter, for example. The robotic system can be moved from one T-950 unit to another adjusting each successive T-950 unit in line with the laser beam using the adjustable feet on each respective T-950 unit. When aligned, the T-950 units can be bolted together for added alignment assurance and stability. Once the T-950 system is aligned along the laser beam, the operation of the upper and lower guides with the robotic system is ensured to enable the robotic system to access all LTO-2 tape cassettes and tape drives intended to be accessed within the T-950 storage apparatus. The storage apparatus alignment can also be leveled by a leveling system, such as a bubble leveler, built-in with the laser pointer, however, this does not necessarily enhance cassette or drive accessibility.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the storage units are not limited to tape cassette and tape device systems, such as the tape cassettes 134 and the tape storage devices 122, and can be units containing disc drive magazines, optical media, or other storage media and cooperating devices while still maintaining substantially the same functionality without departing from the scope and spirit of the present invention. In addition, for even greater accuracy and efficiency, multiple alignment indication devices may optionally be employed. Further, this system could be used with two or more storage units without departing from the scope and spirit of the present invention. Also, this system could be configured to form a circle as viewed looking down on the storage apparatus from above the storage system, i.e. looking down on the top of the storage system, while maintaining alignment for the robotic system 126 to traverse across all of the storage units 302 without departing from the scope and spirit of the present invention. Finally, although the preferred embodiments described herein are directed to storage units, such as unit 100, for use in a storage apparatus, such as storage apparatus 300, and related technology, it will be appreciated by those skilled in the art that the teachings of the present invention can be applied to other systems, such as other kinds of storage cabinets having access requirements by a robotic system requiring some level of alignment to adequately function without departing from the spirit and scope of the present invention.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. An alignment system for a storage apparatus comprising:
    a first and second storage unit comprising media support locations;
    the support locations capable of supporting at least one storage media element;
    at least one storage device adapted to store and retrieve data to and from the media element associated with at least one of the storage units;
    at least one robotic system;
    an alignment indication device;
    an alignment means capable of positioning the first and second storage unit substantially in alignment for the robotic system to access the media support locations and the storage device wherein the alignment means cooperates with the alignment indication device to confirm the positioning is in alignment.

2. The alignment system of claim 1 wherein the storage units comprise a storage library.

3. The alignment system of claim 1 wherein the storage device is disposed in one of the storage units.

4. The alignment system of claim 1 wherein the alignment indication device further cooperates with the robotic system to confirm the positioning is in aligmnent.

5. The alignment system of claim 4 wherein the robotic system comprises a means to traverse across the storage units in a traverse path wherein the alignment is confirmed at different points along the traverse path.

6. The alignment system of claim 1 further comprising an upper and a lower robot guide adapted to provide a path for the robotic system to traverse across the first and second storage units and wherein alignment is accomplished when the upper and lower robot guides are substantially parallel and planar.

7. The alignment system of claim 6 wherein the alignment is further accomplished when the upper and lower robot guides are substantially the same length.

8. The alignment system of claim 7 wherein the alignment is further accomplished when the upper and lower robot guides each having a leading edge are aligned in substantially the same vertical position.

9. The alignment system of claim 1 wherein the alignment means is accomplished with at least one adjustable foot device.

10. The alignment system of claim 1 wherein the alignment indication device is from the group consisting of: a laser pointer and target system, a string and ruler system, and a camera and target system.

11. The alignment system of claim 1 further comprises a leveling means to substantially level the first and the second storage unit.

12. The alignment system of claim 1 further comprising a third storage unit comprising media support locations; and wherein the alignment means is capable of positioning the first, the second and the third storage unit substantially in alignment.

13. A method for aligning a storage apparatus comprising:
providing an alignment guide for a first and second storage unit;
positioning the first and second storage unit substantially into alignment with guidance from the alignment guide;
accessing all storage media elements and storage drive devices comprised by the first and second storage units intended to be accessed by a robotic system when the first and second storage units are substantially in alignment.

14. The method of claim 13 wherein the positioning step is accomplished by at least one adjustable foot device.

15. The method of claim 13 further comprising traversing a robotic system across the first and the second storage unit wherein the robotic system is used with the alignment guide as an alignment feedback mechanism for alignment.

16. The method of claim 13 further comprising leveling the first and the second storage unit with a leveling means.

17. A means for aligning a storage apparatus comprising:
a means for guiding a first and second storage unit into position for a robotic system to access all storage media elements and storage drive devices intended to be accessed by the robotic system all of which are comprised by the first and second storage units;
a means for moving the first and second storage unit into the position.

18. The means of claim 17 further comprising a means for traversing the robotic system across the first and the second storage unit wherein the means for guiding comprises using the robotic system as an alignment confirmation device.

19. The means of claim 17 further comprising a means for leveling the first and second storage unit.

20. The means of claim 17 further comprising a means for the robotic system to traverse the first and second storage units to access all storage media elements and storage drive devices intended to be accessed by the robotic system when the first and second storage units are in alignment.

21. An alignment system for aligning a first data storage unit and a second data storage unit, each of the storage units including at least one of a storage media element and a storage device, the system comprising:
a robotic system for moving a storage media element from the first data storage unit to the second data storage unit;
an alignment indication device for aligning the first data storage unit with the second data storage unit so that the robotic system is able to access each storage media element and each storage device included in the first data storage unit and in the second data storage unit.

* * * * *